(12) United States Patent
Hori

(10) Patent No.: US 6,404,560 B1
(45) Date of Patent: Jun. 11, 2002

(54) PRESSURE PROOF OPTICAL APPARATUS

(75) Inventor: Kenji Hori, Toyko (JP)

(73) Assignee: Nikon Corporation, Tokyo (JP)

( * ) Notice: Subject to any disclaimer, the term of this patent is extended or adjusted under 35 U.S.C. 154(b) by 12 days.

(21) Appl. No.: 09/626,884

(22) Filed: Jul. 27, 2000

(30) Foreign Application Priority Data

Jul. 28, 1999 (JP) .......................... 11-213812

(51) Int. Cl.⁷ .............................. G02B 3/12; G02B 7/02
(52) U.S. Cl. ...................................... 359/665; 359/819
(58) Field of Search ................ 359/808, 819, 359/820, 665

(56) References Cited

U.S. PATENT DOCUMENTS

| | | | |
|---|---|---|---|
| 3,788,730 A | * 1/1974 | Greenleaf | 359/665 |
| 4,852,508 A | 8/1989 | Takada | 114/177 |
| 5,002,372 A | * 3/1991 | Tamamura | 359/665 |
| 5,134,468 A | * 7/1992 | Ohmuro | 348/337 |
| 5,446,591 A | * 8/1995 | Medlock | 359/666 |
| 5,532,880 A | * 7/1996 | Robb | 359/665 |
| 5,668,620 A | * 9/1997 | Kurtin | 351/158 |
| 5,774,273 A | * 6/1998 | Bornhorst | 359/665 |
| 5,973,852 A | * 10/1999 | Task | 359/666 |

FOREIGN PATENT DOCUMENTS

| | | |
|---|---|---|
| JP | 5-323437 | 12/1993 |
| JP | 6-6647 | 1/1994 |

* cited by examiner

*Primary Examiner*—Georgia Epps
*Assistant Examiner*—Gary O'Neill
(74) *Attorney, Agent, or Firm*—Miles & Stockbridge P.C.

(57) ABSTRACT

A pressure-proof optical apparatus used a high-pressure environment such as a deep sea, comprises an external side optical member disposed on the side of an external region, an internal side optical member disposed on the side of an internal region, a liquid filling portion formed by filling a space between the external side optical member and the internal side optical member with a liquid, and a liquid receding passageway for receding the liquid in the liquid filling portion if the external side optical member deforms. The external side optical member, the internal side optical member and the liquid are transparent with respect to the light that should be observed. At least one of the external side optical member and the internal side optical member may have refracting power.

17 Claims, 9 Drawing Sheets

SHAPE UNDER NORMAL PRESSURE

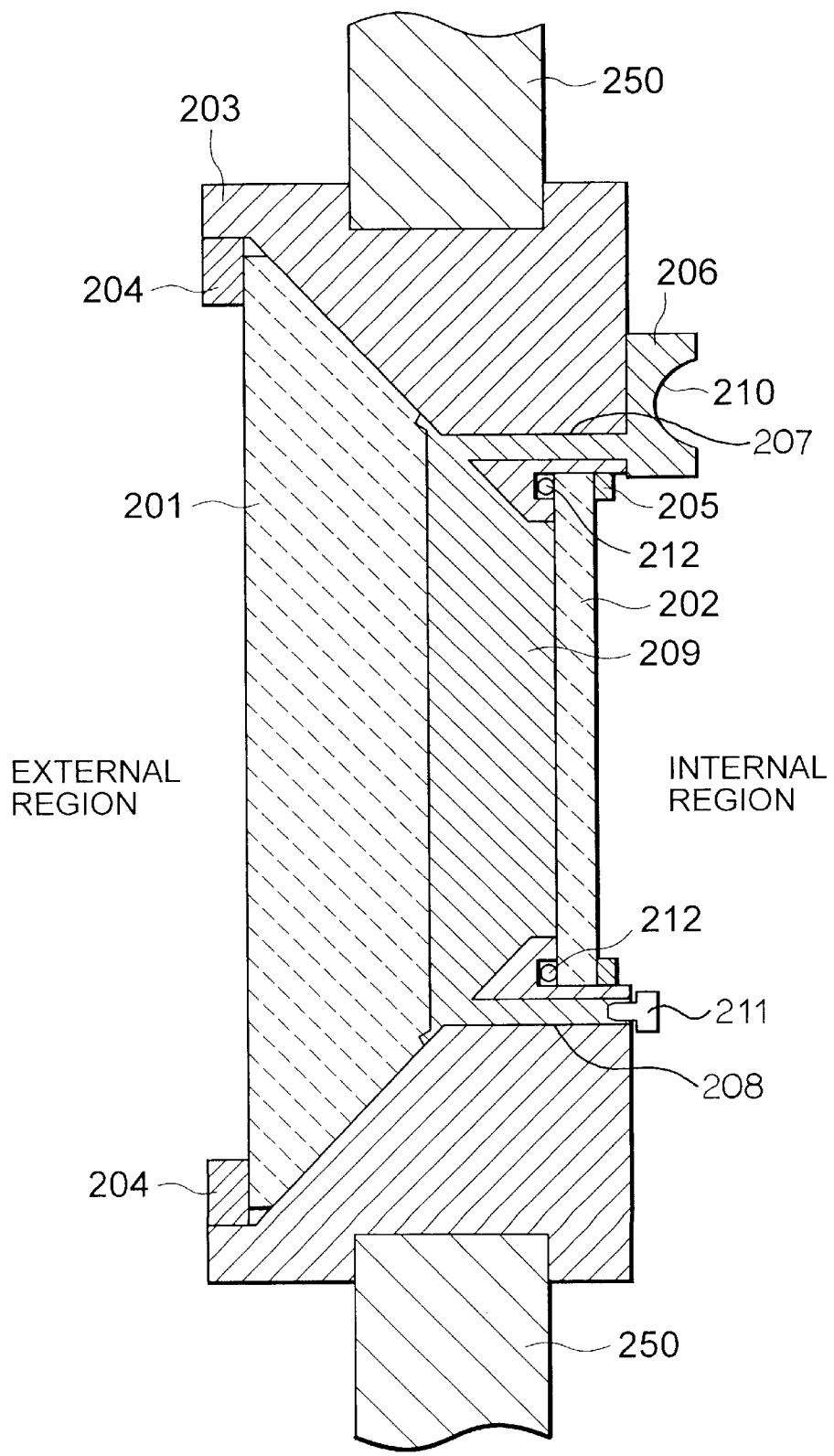

A1  B1

A2  B2

A3  B3

PRESSURE PROOF OPTICAL APPARATUS

This application claims the benefit of Japanese Applications No. 11-213812 now J.P. Publication No. 2001-039387 which is hereby incorporated by reference.

BACKGROUND OF THE INVENTION

1. Field of the Invention

The present invention relates to a pressure-proof optical apparatus for equipment used under a high-pressure environment. Herein, being "under the high-pressure environment" implies a deep ocean, or a high-pressure reaction chamber, etc. The "equipment used under the high-pressure environment" may embrace categories of a deep ocean survey vehicle itself or the high-pressure reaction chamber itself, etc., which is used in a place where there is a large pressure difference between the external environment and the internal environment, or an imaging apparatus such as a camera used as a part of the above equipment, i.e., the deep ocean survey vehicle or the high-pressure reaction chamber receiving the large pressure difference between the external environment and the internal environment, or an imaging apparatus such as a camera exposed directly to the high-pressure environment as in the deep ocean or the high-pressure reaction chamber, etc. Further, the pressure-proof optical apparatus implies a pressure-proof window provided in the deep ocean survey vehicle or vessel, or the high-pressure reaction chamber itself used in the place where there is. the large pressure difference between the external-environment and the internal environment, or an imaging apparatus such as a camera used as a part of these apparatuses. The pressure-proof optical apparatus may further embrace a part of lens unit of the imaging apparatus such as a camera (pressure-proof underwater camera) exposed directly to the high-pressure environment as in the deep ocean, the high-pressure reaction chamber, etc.

2. Related Background Art

What has hitherto been known as a pressure-proof optical apparatus for equipment used under a high-pressure environment as in the case of a deep ocean survey vehicle, takes such a structure that an optical element which transmits the light is composed of plastic, or a glass, or quartz, or plastic properly cemented with glass.

A plastic window, because of the plastic itself exhibiting a small rigidity, is largely flexed or deformed when a high pressure is applied thereto. For preventing this large flexure, a thickness of the window is set large to a considerable degree. By contrast, the window composed of a glass or a transparent crystalline material such as quartz has a high rigidity and is therefore smaller in quantity of flexure than the plastic window but weak against a mechanical impact.

FIG. 1 shows the conventionally used pressure-proof window. This type of prior art pressure-proof windows, whether made of plastic or glass, inevitably become more or less flexural when the high pressure is applied. In the case of the window having a structure as shown in FIG. 1, a periphery of a window member 101 is fixed by a support member 102, and hence a central portion has a larger quantity of deformation due to the flexure than in the peripheral portion. If the window is thus flexed or deformed, the light coming from outside is refracted at an interface between the external region and the window member 101 with a difference in refractive index therebetween, and further refracted at an interface between the window member 101 and the internal region. This causes a problem in which an observed image of the outside is largely distorted. Especially when photographing the outside via the window, an image quality of the picture photographed is deteriorated. When trying to obtain a high-quality picture, the deterioration in image quantity turns out to be a serious problem.

SUMMARY OF THE INVENTION

It is a primary object to provide an pressure-proof optical apparatus capable of minimizing the deterioration of an observed image even when used under a high-pressure environment.

To accomplish the above object, according to one aspect of the present invention, a pressure-proof optical apparatus comprises an external side optical member disposed on the side of an external region, an internal side optical member disposed on the side of an internal region, a liquid filling portion formed by filling a space between the external side optical member and the internal side optical member with a liquid, and a liquid receding passageway for receding the liquid in the liquid filling portion if the external side optical member deforms. The external side optical member, the internal side optical member and the liquid are transparent with respect to the light that should be observed.

At least one of the: external side optical member and the internal side optical member may have refracting power.

The pressure-proof optical apparatus may further comprise a liquid receptacle, connected to the liquid receding passageway, for reserving the liquid receded, and a detection unit for detecting a quantity of the liquid reserved in the liquid receptacle in order to detect a pressure applied to the external side optical member.

A third optical member may be disposed on the side of at least one of the external region existing more outside than the external side optical member and the internal region existing more inside than the internal side optical member, and a space between the third optical member and the external or internal side optical member adjacent to the third optical member may be filled with the liquid.

According to another aspect of the present invention, a pressure-proof optical apparatus comprises a partition member for forming a window opened to an external region and an internal region which are connected liquid- and air-tightly to a partition wall for partitioning the external region in a high-pressure environment from the internal region in a normal-pressure environment, an external side optical member disposed liquid- and air-tightly with respect to the partition member on the side of the external region in an intra-window area of the partition member, an internal side optical member disposed liquid- and air-tightly with respect to the partition member on the side of the internal region in the intra-window area of the partition member, a liquid filling portion formed between the external side optical member and the internal side optical member, and filled with the liquid, and a liquid receding passageway for receding the liquid in the liquid filling portion if the external side optical member deforms. The external side optical member, the internal side optical member and the liquid are transparent with respect to the light that should be observed.

According to a further aspect of the present invention, a taking optical lens unit comprises a first optical system arranged at a front end of the lens unit and composed of a pressure-proof optical apparatus as set forth in any of claims of the present application and a second optical system arranged behind said first optical system and forming a taking optical system together with said first optical system.

In the last mentioned taking optical lens unit, said first optical system has an external side surface facing the external region, which surface is planer, concave or convex toward the external region.

BRIEF DESCRIPTION OF THE DRAWINGS

FIG. 2 is a sectional view showing a configuration of a pressure-proof optical apparatus in a first embodiment of the present invention;

DESCRIPTION OF THE PREFERRED EMBODIMENTS

Figure 1:
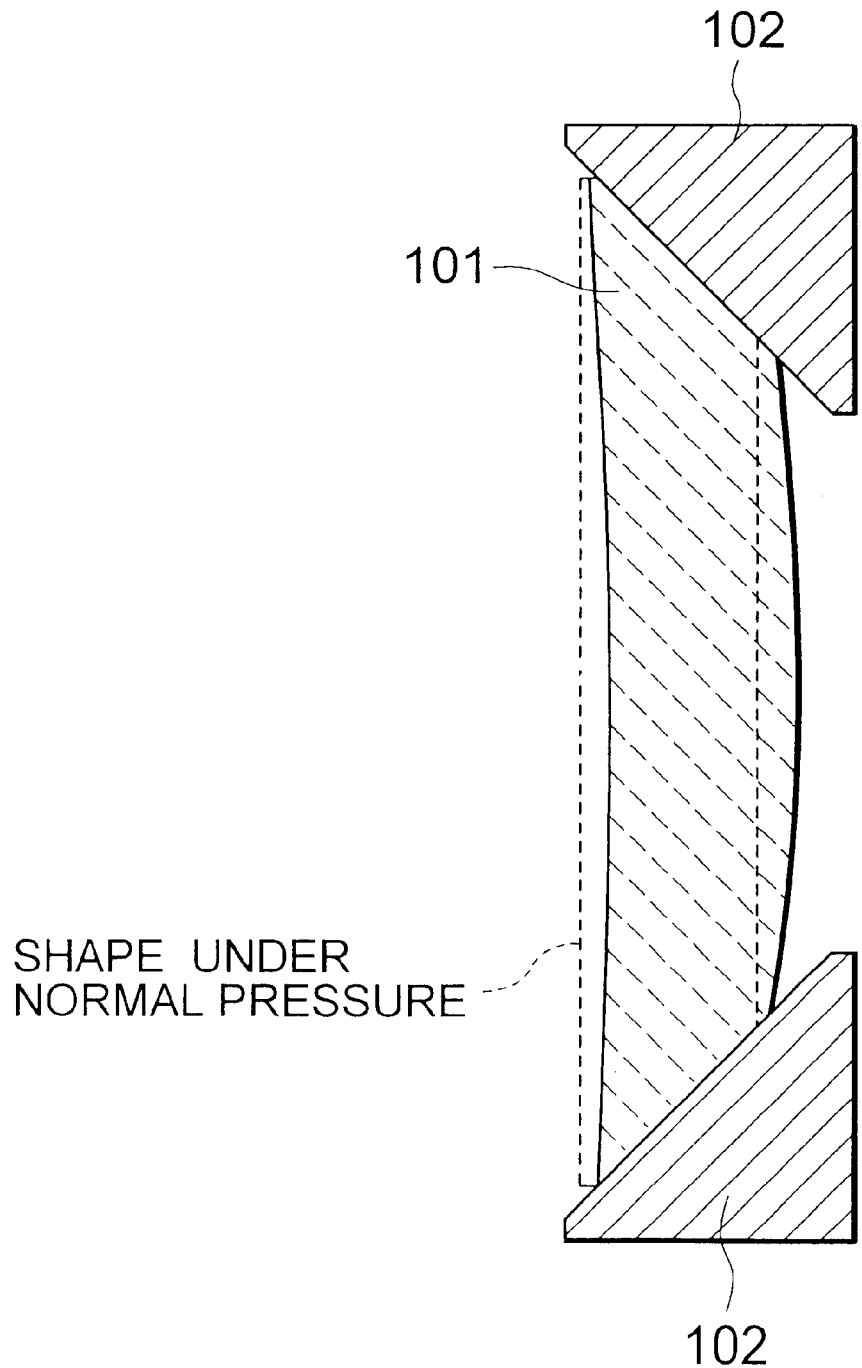
FIG. 1 is a sectional view showing a configuration of a conventional pressure-proof window and a state where a window member deforms by a pressure.

Embodiments of the present invention will hereinafter be described with reference to the accompanying drawings.

First Embodiment

To start with, a first embodiment of an optical apparatus serving as a pressure proof window suitable for use in a way of being fitted in a part of wall surface of a deep ocean survey vehicle or vessel, will be explained referring to FIGS. 2, 3A, 3B and 4.

As illustrated in FIG. 2, the pressure proof optical apparatus in the first embodiment includes an external side optical member 201 provided on the side contiguous to a high-pressure external region, and an internal side optical member 202 provided on the side contiguous to a constant-pressure (approximately 1 atm) internal region. The external side optical member 201 and the internal side optical member 202 are disposed in a face-to-face relation at a spacing, of which peripheral portions are supported by a support member 203. The support member 203 is formed integrally with or separately from a wall 250 of the unillustrated deep ocean survey vehicle, which may be a side wall, a top wall or a bottom wall. When the support member 203 is formed separately from the side wall, the top wall and/or the bottom wall of the deep ocean survey vehicle, a pressure proof window structural body illustrated in FIG. 2 may be assembled beforehand as a unit and incorporated by fitting to predetermined portions of the wall. In this case, however, what is needed between the support member 203 and the above-mentioned fitting wall of the deep ocean survey vehicle is a seal connection structure in which a pressure difference between the external region and the inter region is kept and there is no possibility of permeation of seawater, etc.

A space, of which a periphery is defined by the support member 203, is formed between the external side optical member 201 and the internal side optical member 202. In the first embodiment, this space is filled with a liquid, thereby forming a liquid filling portion 209.

A material of each of the external side optical member 201, the internal side optical member 202 and the liquid filing portion 209 is transparent to beams of light (which are herein visible) having wavelengths that should be taken in from the external region. In the first embodiment, the external side optical member 201 is composed of an acrylic resin, while the internal side optical member 202 is composed of an optical glass.

Further, it is required that the liquid in the liquid filling portion 209 be always in a liquid state under an environment where this window is used as well as being transparent, and a refractive index of this liquid be, it is desirable, as close as to a refractive index of the external side optical member 201. In the first embodiment, a temperature at which the window is used is set at −2° C. to 32° C., and a refractive index of the acrylic resin of the external side optical member 202 is 1.497. Taking these parameters into consideration, the liquid in the liquid filling portion 209 may involve the use of phthalic acid di-2-ethylhexyl (refractive index: 1.483). In addition, there may be used other liquids such as silicone oil (brand name [Opto Seal] made by Shinetsu Silicone Co., Ltd., refractive index: 1.469). ethylene, glycol (refractive index: 1.377), ethyl alcohol (refractive index: 1.362), a mixture (refractive index: 1.333–1.377) of ethylene glycol and water, and so on.

Further, a material of the optical glass composing the internal side optical member 202, which is herein selected, may have substantially the same refractive index as the acrylic resin.

Figure 3A:
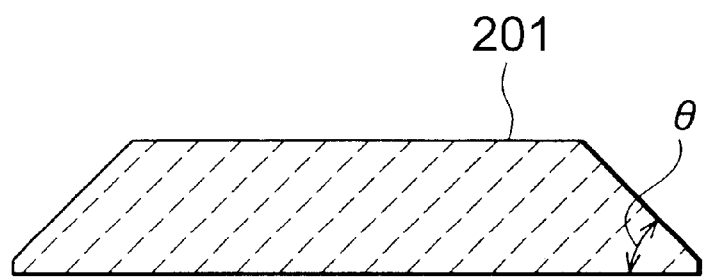
FIG. 3A is a sectional view showing an external side optical member 201 of the pressure-proof optical apparatus in FIG. 1.
Figure 3B:
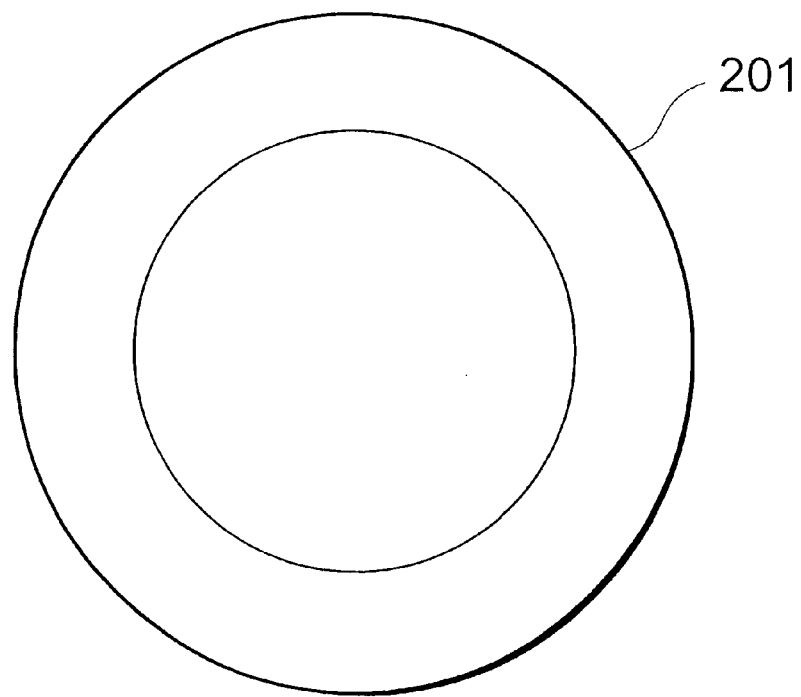
FIG. 3B is a front view thereof.

A shape of the external side optical member 201 in a direction of the principal plane be, it is determined, circular as shown in FIG. 3B. A diameter of the external side optical member 201 on the side of the internal region is smaller than a diameter on the side of the external region. A thickness of the external side optical member 201 is set large enough to obtain a rigidity well resistive against a breakage even when a large pressure (which is herein 300 atm) that the pressure proof window in the first embodiment should withstand. Further, an angle θ made by an external-region-sided surface of the external side optical member 201 (which surface faces the external region) and a side surface thereof, is set to 45 degrees. To give specific dimensions, a diameter of an external-region-sided surface of the external side optical member 201 is 192 mm, a diameter of an internal-region-sided surface thereof is 102 mm, a thickness is 50 mm, and an outer periphery of the external-region-sided surface is chamfered with a width of 5 mm, thus configuring the optical member 201. Further, a spacing (corresponding to a thickness of the liquid filling portion 209) between the external side optical member 201 and the internal side optical member 202, is set to 3 mm in a non-applying state of a high pressure. In this case, a volumetric capacity of the liquid filling portion 209 is 0.0238 liter.

The internal side optical member 202 takes a thin plate-like configuration. According to the structure in the first embodiment, no high pressure is applied to the internal side optical member 202 that is not therefore required to have a high-pressure withstanding thickness.

The support member 203 is made of metal such as aluminum, stainless steel, titanium, etc., and an inner peripheral surface for supporting the external side optical member 201 is so sloped-as to be slidable on an outer peripheral surface of the external side optical member 201. A length of this sloped portion of the support member 203 is larger than the thickness of the external side optical member 201. Therefore, the external side optical member 201, when receiving the high pressure, slides along the inner peripheral surface of the support member 203 toward the internal region, and is more firmly press-fitted to the inner peripheral surface of the support member 203. Further, for preventing the external side optical member 201 from coming off on the side of the external region when the high pressures is not applied, a ring-like stopper 204 is secured to an external-region-sided edge of the support member 203. Moreover, for keeping the liquid filling portion 209 in a hermetic state so that the liquid therein does not leak out to the external region when the pressure is not applied, and so that the water, etc. from the external region does not permeate the liquid filling portion 209 when the high pressure is applied, the outer peripheral surface of the external side optical member 201 and the inner peripheral surface of the support member 203, are smoothed at a high accuracy. Further, as the necessity may arise, a layer of grease, etc. may also be formed between the outer peripheral surface of the external side optical member 201 and the inner peripheral surface of the support member 203.

Moreover, a ring-like fixing member 205 is provided, on the internal region side at an internal-region-sided edge of the support member 203 in order to support the internal side optical member 202. A packing member 212 such as an O-ring, etc. is provided between the internal side optical member 202 and the support member 203, thereby preventing the liquid in the liquid filling portion 209 from leaking out on the side of the internal region.

Further, the volumetric capacity of the liquid filling portion 209 decreases due to the external side optical member 201 sliding towards the internal region and being flexed or deformed when the high pressure is applied, and therefore there is provided a liquid receding passageway 207 for receding the liquid existing therein. This liquid receding passageway 207 is a through-hole formed in the support member 203 so as to communicate with the liquid filling portion 209 from the internal region side, and a liquid receptacle 206 is provided at an opening of the through-hole on the side of the internal region. An opening of the through-hole of the liquid receding passageway 207 on the side of the liquid filling portion 209, is formed in such a position as not to be closed by the external side optical member 201 even when a slide quantity of the external side optical member 201 comes to its maximum.

The liquid receptacle 206, of which some wall surface contiguous to the internal region is formed of an elastic membrane 210, is so constructed as to deform corresponding to a quantity of the liquid extruded from the liquid filling portion 209 and to reserve the liquid while changing an internal capacity.

Note that a liquid receding passageway 208 is also provided in a lower part in the construction in FIG. 2 but is not fitted with the liquid receptacle 206. An opening of the liquid receding passageway 208 is closed by a plug 211 and opened when refilled with the liquid.

Next, operations of the respective components of the pressure-proof window in the first embodiment will be explained.

To begin with, supposing that the deep ocean survey vehicle is afloat on the sea surface and that there is no pressure difference between the external region and the internal region, the external side optical member 201 and the internal side optical member 202 are, as shown in FIG. 2, parallel to each other, and interfaces between the external region and the. external side optical member 201, between the external side optical member 201 and the liquid filling portion 209, between the liquid filling portion 209 and the internal side optical member 202 and between the internal side optical member 202 and the internal region, are parallel. to each other. Therefore, the light perpendicularly incident upon the external side optical member 201 from the external region, penetrates straight these interfaces and arrives at the internal region. Accordingly, there does not occur deterioration of an observed image due to the optical elements of the window, whereby the outside can be normally observed.

By contrast, when the deep ocean survey vehicle submerges deep, the external region subjected to a high pressure.(e.g., 300 atm), while the internal regions remains at 1 atm, and hence a pressure difference (299 atm) therebetween is applied to the external side optical member 201. The external side optical member 201 is thereby slid along the support member 203 towards the internal region and is flexed or deformed on the side of the internal region as shown in FIG. 4 as well as being firmly press-fitted to the support member 203.

Thus, if the flexure occurs in the external side optical member, the volumetric capacity of the liquid filling portion 209 becomes smaller than when the high pressure is not applied, with the result that the liquid in the liquid filling portion 209 is forced to flow out into the liquid receptacle 206 via the liquid receding passageway 207. Then, the liquid is reserved in the liquid receptacle 206 with a swelling of the elastic membrane 210 of the liquid receptacle.206. Thus, the liquid is receded into the liquid receptacle 206, and hence the high pressure is not applied to the internal side optical member 202, whereby the interface between the internal side optical member 202 and the liquid filling portion 209 remains to be plane.

Figure 4:
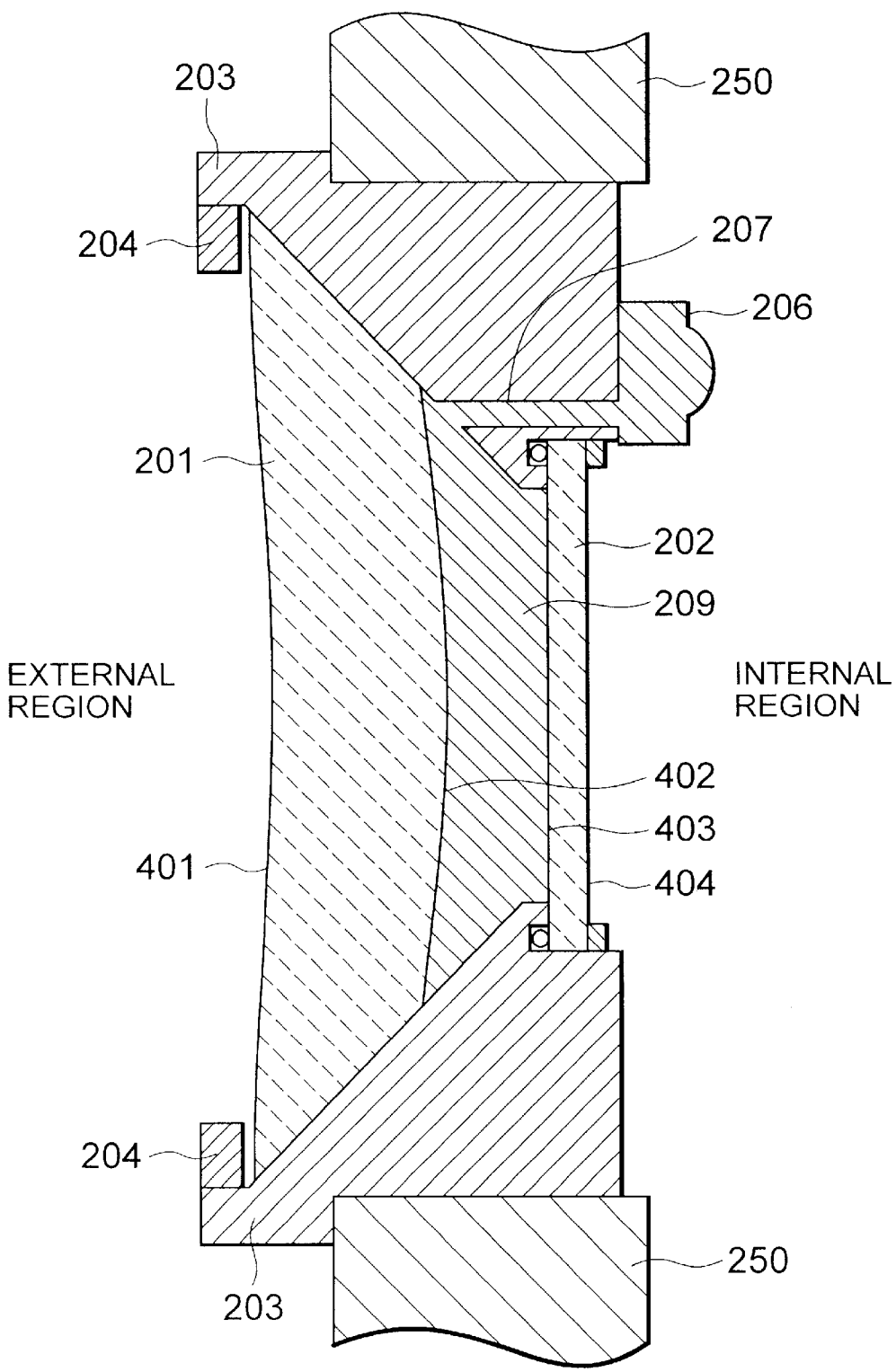
FIG. 4 is a sectional view showing configurations of respective members in a state where a high pressure is applied to the pressure-proof optical apparatus in FIG. 2.

Hence, with the flexure or deformation of the external side optical member 201, as illustrated in FIG. 4, an interface 401 between the external region and the external side optical member 201 and an interface 402 between the external side optical member 201 and the liquid filling portion 209, are bent, however, an interface 403 between the liquid filling portion 209 and the internal side optical member 202 and an interface 404 between the internal side optical member 202 and the internal region, remain to be plane.

In this state, the light penetrating the present optical apparatus from outside is refracted at the interface 401 between the external region and the external. side optical member 201, and thereafter travels through the interface 402 between the external side optical member 201 and the liquid filling portion 209. At this time, in the pressure-proof optical apparatus in the first embodiment, the liquid in the liquid filling portion 209, which is herein selected, exhibits substantially the same refractive index as the material of the external side optical member 201, and therefore, even when the interface 402 is bent, the light is not refracted at this interface 402 but travels straight. Further, the interface 403 between the liquid filling portion 209 and the internal side optical member 202 and the interface 404 between the internal side optical member 202 and the internal region, are plane, so that the light is not refracted but travels straight. Hence, even when the external side optical member 201 is subjected to the high pressure and is flexed or deformed, according to the optical apparatus having the above construction in the first embodiment, the light from outside is refracted merely once at the interface 401 between the external region and the external side optical member 201. By contrast, in the case of the optical apparatus in the prior art, the light is refracted due to a difference in refractive index at an interface between an external region and an optical member 101 and further refracted at an interface between the optical member 101 and an internal region. Hence, the pressure-proof optical apparatus in the first embodiment is capable of making the deterioration of the observed image smaller than by the prior art.

Besides, the liquid filling portion 209 provided in the first embodiment is capable of making the deterioration of the observed image by far smaller than by the prior art because of causing no light refraction at the interface 402 where the light is, if the liquid filling portion is not provided, refracted stronger than at the outside interface 401. The reason why so is herein elucidated. In the case of the deep ocean survey vehicle, a refractive index of the water in the external region is approximately 1.33, and therefore a difference in refractive index from the interface 401 is merely about 0.17. If the liquid filling portion 209 is not provided, however, the refractive index at the interface 402 comes to have a refractive index difference as large as 0.5 from the air. Hence, if the liquid filling portion 209 is not provided, the light is refracted strong at the inside interface 402.

Thus, according to the construction of the pressure-proof optical apparatus in the first embodiment, the interface at which the light is refracted is only the interface 401, and besides this interface 401 exhibits the small difference of refractive index. Therefore, as compared with the prior art, the deterioration of the observed image can be distinctively improved.

Further, in the first embodiment, the external side optical member 201 is made of the resin and is therefore stronger against a mechanical impact than in the case of being composed of glass or crystalline material. Hence, even when receiving the mechanical impact that may be prospective in the case of being used in an outdoor environment such as the deep ocean, etc., the pressure-proof optical apparatus of the first embodiment has an advantage of being hard to break. Further, the external side optical member 201, when composed of the resin, exhibits an advantage in which the outer peripheral surface of the external side optical member 201 is more fittable to the configuration of the inner peripheral surface of the support member 203 with a smaller rigidity thereof, and its hermetic state can be easily kept.

The external side optical member 201 is not, however, necessarily composed of the resin and may be formed of the glass and the crystalline material having a rigidity larger than the resin. In this case, a thickness of the external side optical member 201 can be made smaller. Further, in the case of having the same thickness as the resin, a flexural quantity decreases, and it is therefore feasible to obtain more of the effect of improving the deterioration of the observed image than using the resin. Moreover, the glass and the-crystalline material have a higher heat resistance than the resin, and hence, in the case of the optical apparatus which especially the heat resistance is required of as an environment resisting property, the external side optical member 201 may be composed of the glass.

Further, in the first embodiment, the shapes of the optical members 201, 202 in the direction of the principal plane are set circular, however, other configurations such as a square, a polygon etc. needed for ensuring a desired observation area may be adopted without being limited to the circular shape.

Furthermore, the liquid receding passageway 208 may be structured including the liquid receptacle 206 instead of the plug 211. In addition, for evenly quickly transferring the liquid in the liquid filling portion 209, a plurality of liquid receding passageways and a plurality of liquid receptacles may be further be provided radially along the periphery of the liquid filling portion 209.

Moreover, there may be constructed a pressure sensor for detecting a pressure applied to the elastic membrane 210, the mechanism being such that a plurality of resistors are provided on the elastic membrane 210 of the liquid receptacle 206 in the first embodiment, and the above pressure can be detected by detecting changes in resistance value of the plurality of resistors. A magnitude of the pressure applied to the external side optical member 201 and a change thereof can be detected by monitoring an output of the pressure sensor. Hence, an alarm device for alarming if the pressure becomes larger than a predetermined value or if the pressure abruptly changes, is connected to the external side optical member 201, whereby it is possible to notify of a breakage and a hermetic leakage of the external side optical member 201.

Each of embodiments which will hereinafter be discussed relates to an optical apparatus suitable for a configuring a part of lens elements of an imaging apparatus such-as a camera, etc. directly exposed to the high-pressure environment as in the deep sea, a high-pressure reaction chamber and so on.

Second Embodiment

Next, the optical apparatus in a second embodiment of the present invention will be described referring to FIG. 5.

Figure 5:
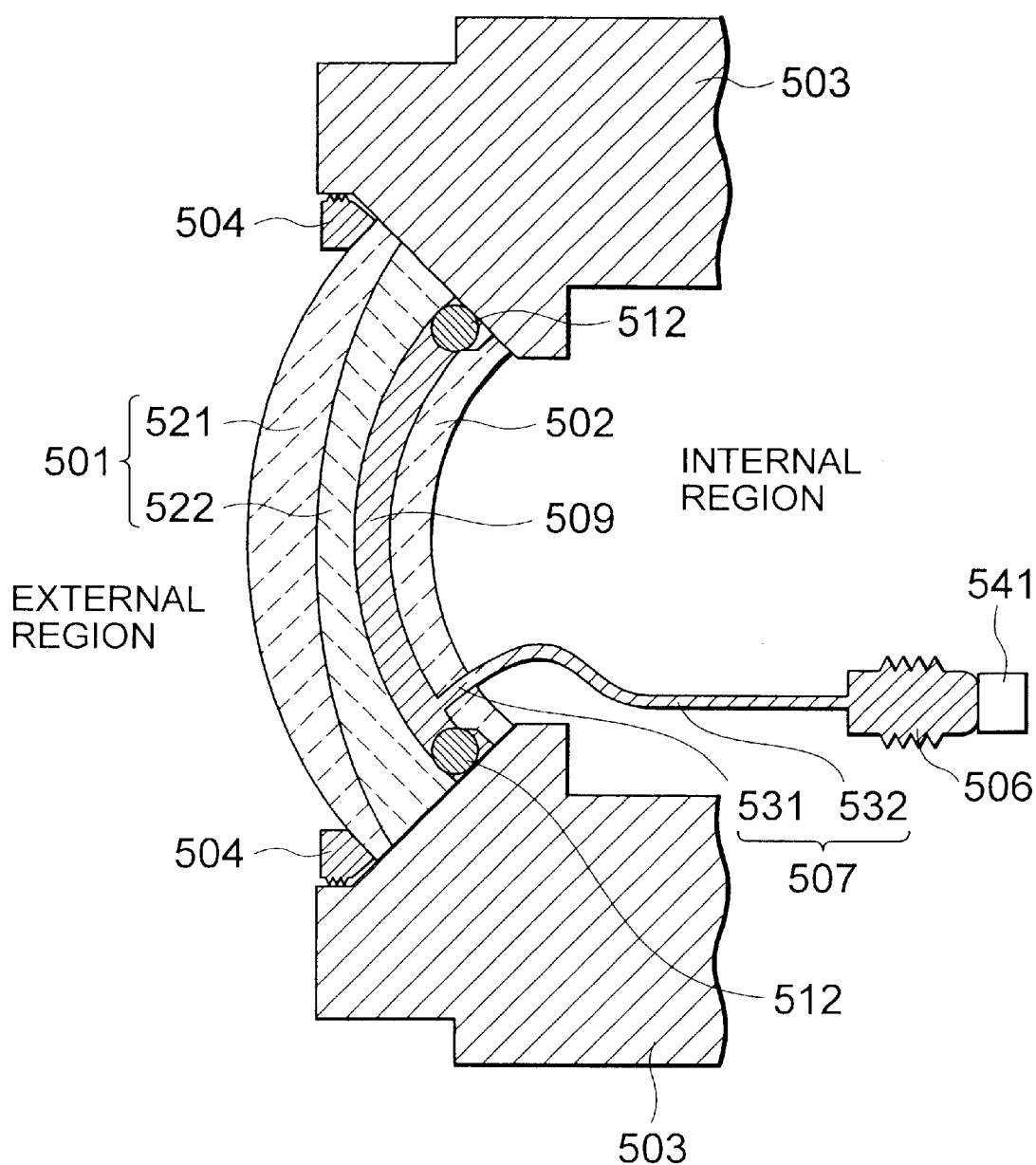
FIG. 5 is a sectional view showing a configuration. of the pressure-proof optical apparatus in a second embodiment of the present invention.

A difference of the optical apparatus in FIG. 5 from the first embodiment is that an external side optical member 501 and an internal side optical member 502 are so formed as to be become a part of a spherical surface. In this case, a lens function occurs both in the external side optical member 501 and the internal side optical member 502, and therefore, when the imaging apparatus such as the camera, etc. disposed in the internal region images an outside image, a radius of curvature, a thickness and a refractive index of each of the optical members-501, 502 are determined to obtain a desired image forming performance, including the optical members 501, 502 and the optical system of the imaging apparatus. When determining the radius of curvature of each of the optical members 501, 502, the radius of curvature may be so designed as to differ on an external region sided surface and on an internal region sided surface with respect to each of the optical members 501, 502.

Besides, in the optical apparatus shown in FIG. 5, the external side optical member 501 is structured so that a first optical member 521 in the side of the external region is cemented to a second optical member 522 on the side of the internal region. The first optical member 521 and the second optical member 522 are composed of optical materials different from each other, and form a cemented lens for correcting a chromatic aberration of magnification, a difference in curvature-of-field quantity due to colors and an off-axis aberration, which are treated as a problem in a wide-angle optical system. The external side optical member 501 disposed closest to an object (the external region) is structured as the cemented lens and thereby corrects the chromatic aberration and the off-axis aberration effectively.

Note that the first optical member 521 and the second optical member 522 are cemented to form the external side optical member 501 as one united element. A side surface of the thus united external side optical member 501 is, as in the case of the external side optical member 201 in the first embodiment, formed so as to slide toward the internal region when the high pressure is applied. Further, when the high-pressure is applied, as in the external side optical member 201 in the first embodiment, the external side optical member 501 becomes flexed or bent. Hence, if the first optical member 521 and the second optical member 522 are composed of the materials exhibiting the different refractive indexes, it is desirable to select the materials so that the material of the first optical member 521 is more approximate to the refractive index of the external region than the second optical member 522. With this mode of selection, the deterioration of the observed image due to the flexure of the external side optical member 501 can be reduced.

The internal side optical member 502 is fixed by bringing the outer peripheral surface into direct contact with the inner peripheral surface of the support member 503. Further, a ring-like packing member 512 is interposed between the external side optical member 501, a chamfered portion of the internal side optical member 502 and the inner peripheral surface of the support member 503. The hermetic state of the liquid filling portion 509 is thereby kept.

A liquid receding passageway 507 is, as seen in the configuration in FIG. 5, constructed of a through-hole 531 formed in such a portion as to cause no obstacle against a visual field of the internal side optical member 502, and of a tube 532 communicating with this through-hole 531.

A liquid receptacle 50 6 connected to the liquid receding passageway 507 is, as seen in the configuration in FIG. 5, a container taking a bellows-like structure. A pressure sensor 541 detects a quantity of the liquid reserved in the receptacle 506 by detecting a length of the bellows, and is thereby capable of detecting a pressure applied to the liquid filling portion 509. It is possible to detect a magnitude and a change of the pressure applied to the external side optical member 501 by monitoring an output of this pressure sensor 541. Hence, an alarm device for alarming if the pressure becomes larger than a predetermined value or if the pressure abruptly changes, is connected to the external side optical member 501, whereby it, is possible to notify of a breakage and a hermetic leakage of the external side optical member 501.

Note that if the high pressure is applied to the external side optical member 501 enough to cause the flexure thereof, the effect of improving the deterioration of the observed image is the same as the first embodiment has excluding the lens effect of the external and internal side optical members 501, 502 themselves.

Third Embodiment

A pressure-proof optical apparatus in a third embodiment will be explained with reference to FIG. 6.

Figure 6:
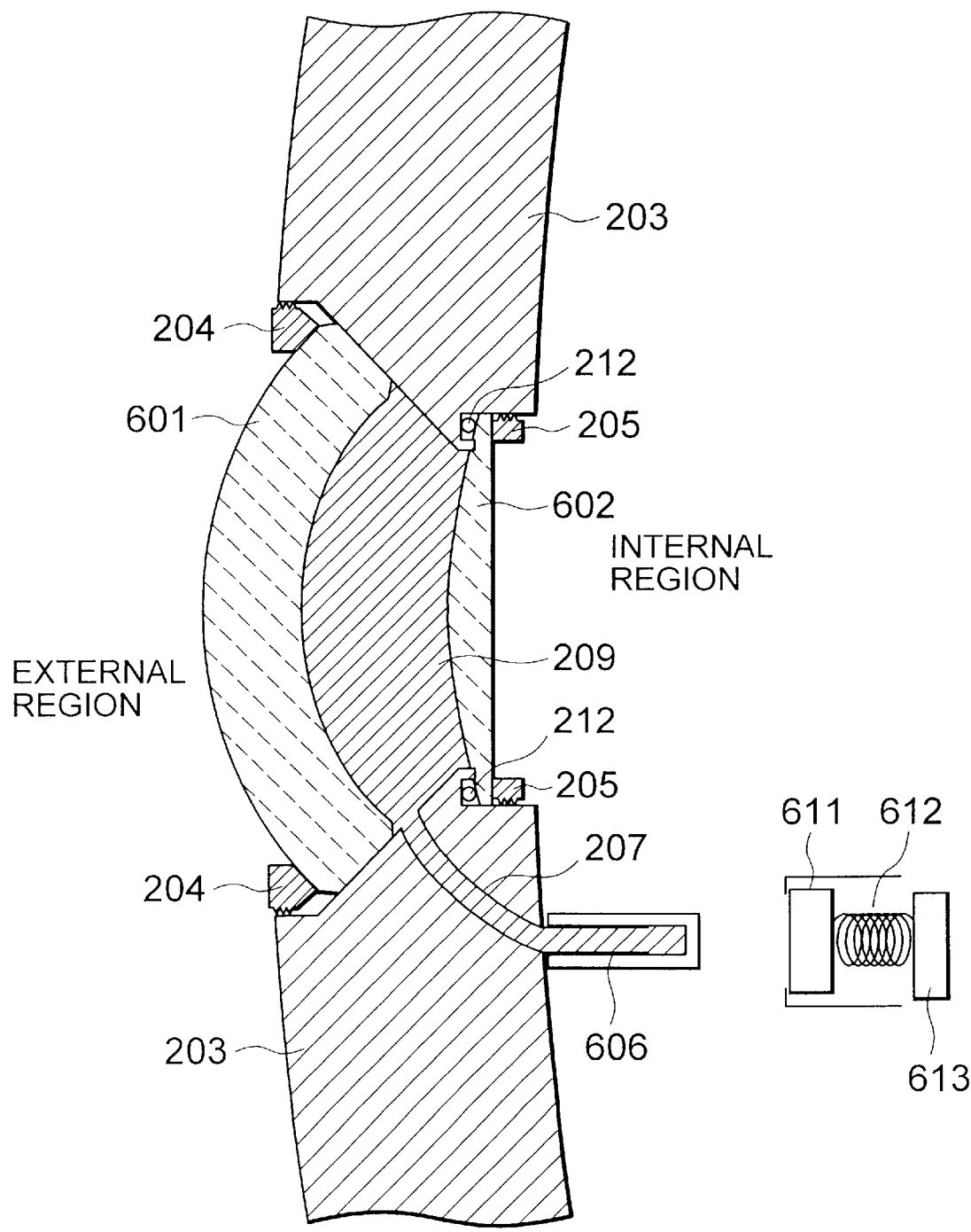
FIG. 6 is a sectional view showing a configuration of the pressure-proof optical apparatus in a third embodiment of the present invention.

The pressure-proof optical apparatus in FIG. 6 has a configuration similar to that of the pressure-proof optical apparatus in FIG. 2 in the first embodiment, and therefore the same components are marked with the like numerals, of which the repetitive explanations are omitted. A difference of the pressure-proof optical apparatus in FIG. 6 from the first embodiment, is that an external side optical member 601 serves as a part of the spherical surface to ensure a wide visual field, and that an internal side optical member 602 is formed in a lens shape. Configurations and refractive indexes of the external and internal side optical members 601, 602 are designed to obtain an optimal image formed by the imaging apparatus, taking into consideration the optical system of the imaging apparatus disposed in the internal region.

Further, the pressure-proof optical apparatus shown in FIG. 6 includes a liquid receptacle 606 taking a cylinder/piston structure. A pressure sensor 611 is disposed in a position of being pressed by the extended piston of the liquid receptacle 606. If the piston extends over a predetermined length, a pressure is detected by the pressure sensor 611. A magnitude and a change of the pressure applied to the external side optical member 601 can be detected by monitoring an output of this pressure sensor 611. Hence, if an alarm device for alarming if the pressure becomes larger than a predetermined value or if the pressure abruptly changes, is connected to the pressure sensor 611, it is possible to notify of a breakage and-a hermetic leakage of the external side optical member 601. Note that the pressure sensor 611 is, as seen in the configuration in FIG. 6, fixed to a fixing member 613 with the aid of a spring 612, and hence, if the piston of the liquid receptacle 606 abruptly moves, the pressure sensor 611 can be prevented from being broken.

In this configuration also in FIG. 6, as in the first embodiment, when the high pressure is applied to the external side optical member 601, the external side optical member slides toward the internal region and becomes flexed or deformed. The volumetric capacity of the liquid filling portion 205 is thereby decreased, with the result that the liquid in the liquid filling portion 209 is forced to transfer. An influence of the pressure is not therefore exerted to the internal side optical member 602. Hence, the deterioration of the image can be restrained small by the same function as the first embodiment.

Fourth Embodiment

A pressure-proof optical apparatus in a fourth embodiment will be described with reference to FIG. 7. The pressure-proof optical apparatus in FIG. 7 has a configuration similar to that of the pressure-proof optical apparatus in FIG. 6 in the third embodiment, and therefore the same components are marked with the like numerals, of which the repetitive explanations are omitted.

Figure 7:
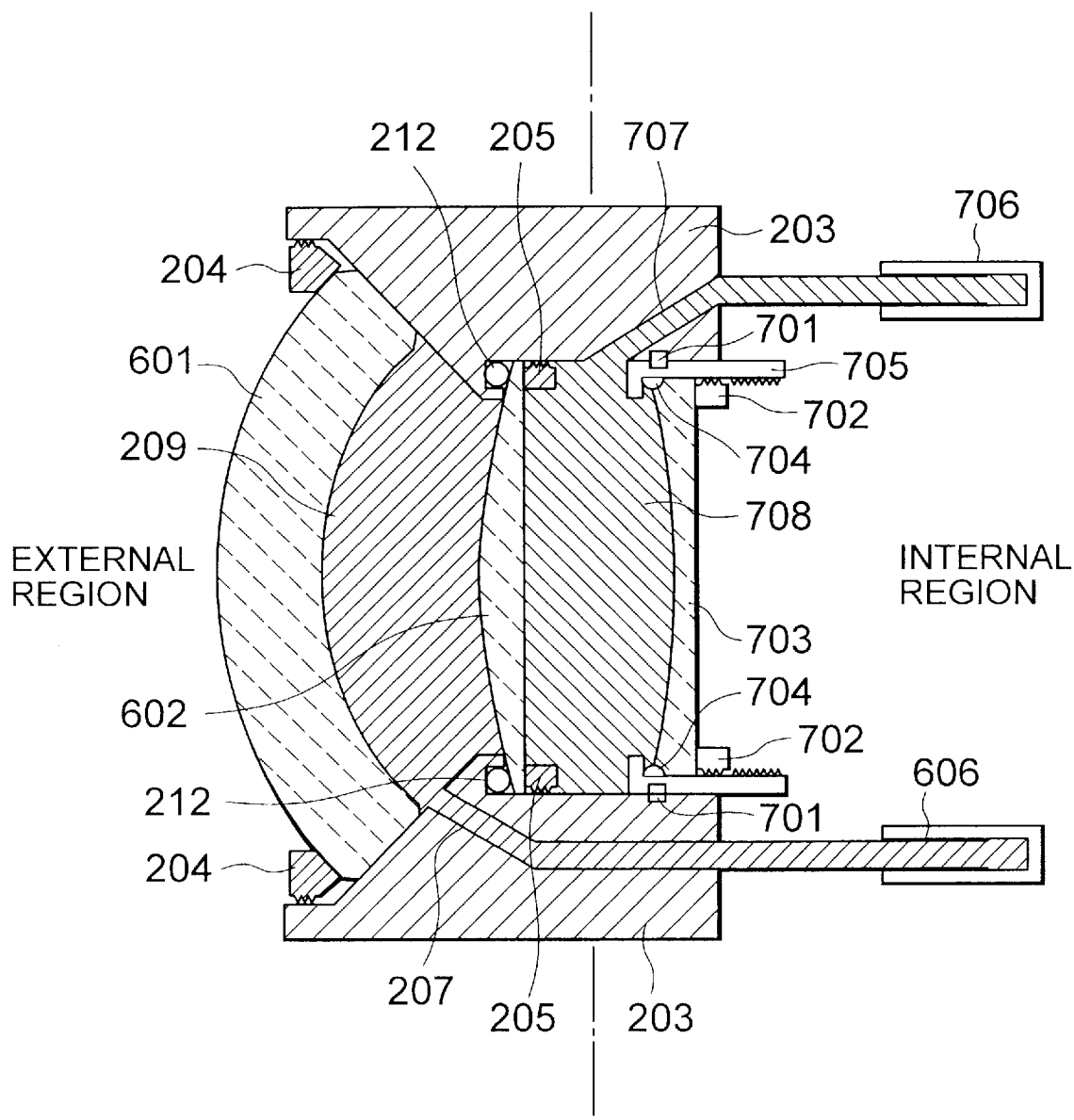
FIG. 7 is a sectional view showing a configuration of the pressure-proof optical apparatus in a fourth embodiment of the present invention.

The support member 203 of the pressure-proof optical apparatus in FIG. 7 takes a configuration extended on the side of the internal region, and a second internal side optical member 703 is supported on the side of the internal region existing more inside than the internal side optical member 602 in FIG. 6. The second internal side optical member 703 takes a lens shape, of which a refractive index and a radius of curvature are designed to obtain an optimal image forming characteristic of the observed image in the imaging apparatus disposed in the internal region, taking into consideration optical characteristics of the optical system of the imaging apparatus and of the-external and internal side optical members 601, 602.

A second internal side optical member 703 is fixed by a fixing member 702 to a slide ring 705 slidably supported on the inner peripheral surface of the support member 203. A space defined by the second internal side optical member 703, the internal side optical member 602 and the support member 203, is filled with the liquid, thus forming a second liquid filling portion 708.

A ring-like packing member 704 is interposed between an outer periphery of the second internal side optical member 703 and the slide ring 705, thereby keeping the hermetic state between the second internal side optical member 703 and the slide ring 705. Further, between the slide ring 705 and the support member 203, the air tightness of the liquid filling portion 708 is kept by a slidable abutment.

A screw 701 protrudes from an outer peripheral surface of the slide ring 705. A guide groove for guiding this screw 701 is helically formed in along the inner peripheral surface of the support member 203. When rotating the slide ring 705, the screw 701 moves along the guide groove, and the slide ring 705 as a whole moves in the axial direction. The second internal side optical member 703 can be thereby moved in the axial direction.

The support member 203 is provided with a liquid receding passageway 707 for receding the liquid in the second liquid filling portion 708. This liquid receding passageway 707 is connected to a liquid receptacle 706. Hence, if the volumetric capacity of the second liquid filling portion 708 decreases with the axial movement of the second internal side optical member 703, the liquid is receded into the second liquid receptacle 706. Whereas if the volumetric capacity of the second liquid filling portion 708 increases, the liquid in the second liquid receptacle 706 is supplied to the second liquid filling portion 708. The second liquid filling portion 708 is thereby kept in a state of being always filled with the liquid.

The liquid in the second liquid filling portion 708 may involve the use of a liquid of which a refractive index and a transmitting characteristic are selected to obtain an optimal image forming characteristic of the observed image in the internal imaging apparatus. Hence, the same liquid as the liquid that fills the liquid filling portion 209 may be used, or another liquid may also be used. Further, if a liquid exhibiting a characteristic of absorbing the visible light or a transparent liquid that is dyed is used as the liquid defined herein, a spectral transmitting characteristic is changed by changing a thickness of the second liquid filling portion 708 while moving the second internal side optical member 703 in the axial direction. The pressure-proof capable of changing the spectral transmitting characteristic can be actualized.

Note that a driving source for moving the second internal side optical member 703 may involve the use of a motor disposed to rotate the slide ring 705, or a driving mechanism, disposed at the second liquid receptacle 706, for moving the second internal side optical member 703 by changing the pressure within the second liquid filling portion 708 in a way of pushing and pulling the piston of the second liquid receptacle 706.

It is to be noted that the configuration in FIG. 7 gives an example where the second internal side optical member 703 takes the lens shape, however, if a scheme is to obtain only the function of making variable the spectral transmitting characteristic depending on the change in thickness of the second liquid filling portion 708, the second internal side optical member 703 may be a transparent parallel plate.

Fifth Embodiment

A pressure-proof optical apparatus in a fifth embodiment will be described with reference to FIG. 8. The pressure-proof optical apparatus in FIG. 8 has a configuration similar to that of the pressure-proof optical apparatus in FIG. 6 in the third embodiment, and therefore the same components are marked with the like numerals, of which the repetitive explanations are omitted.

Figure 8:
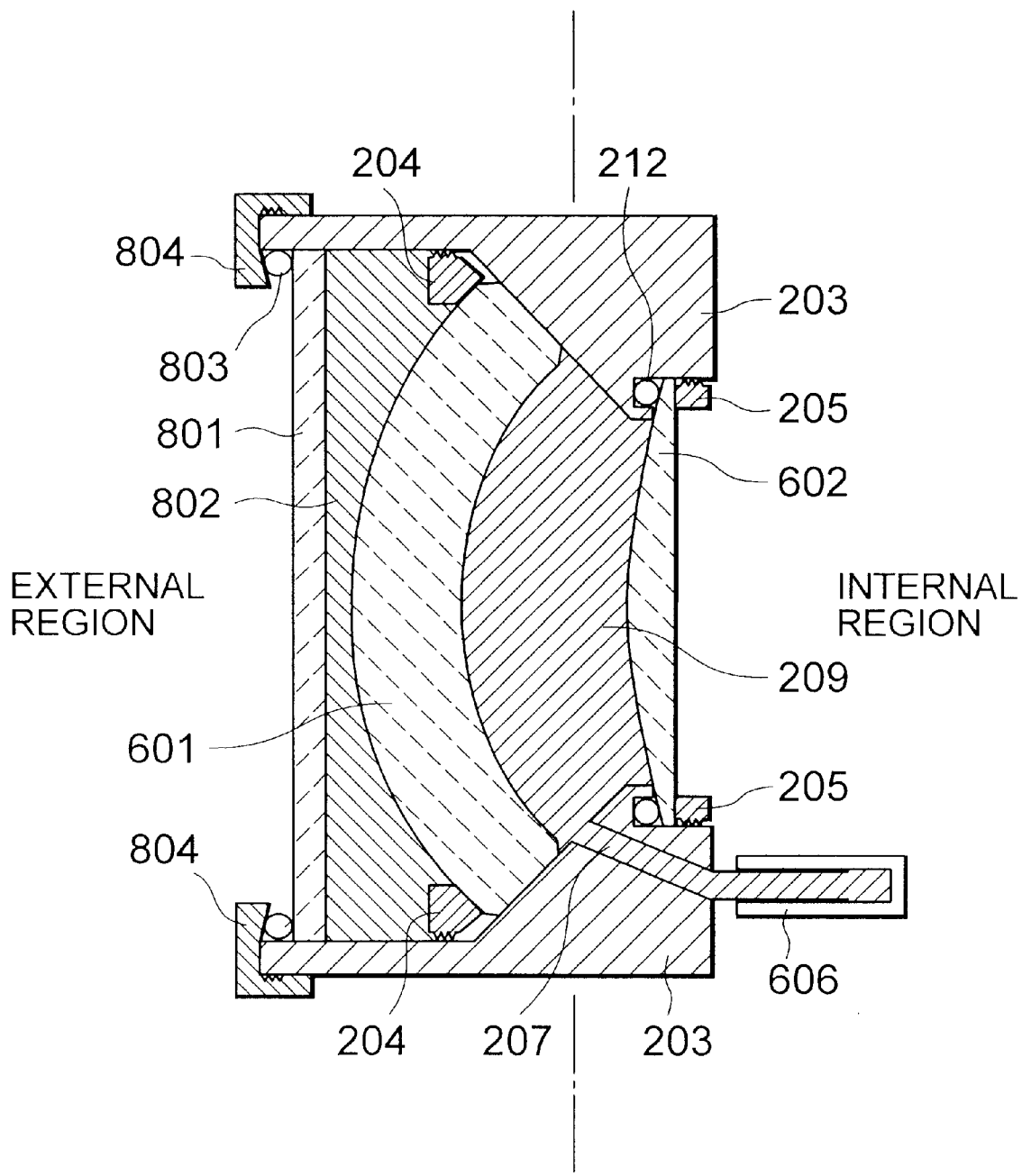
FIG. 8 is a sectional view showing a configuration of the pressure-proof optical apparatus in a fifth embodiment of the present invention.

The support member 203 of the pressure-proof optical apparatus in FIG. 8 takes a configuration extended on the side of the external region, and a second external side optical member 801 is disposed on the side of the external region existing more outside than the external side optical member 601 in FIG. 6. The second external side optical member 801 is composed of a material transparent with respect to the light (which is visible herein) from the outside that should be observed. Both of the outer peripheral surface of the optical member 801 and the inner peripheral surface of the support member 203 are smoothed at a high accuracy, and an area at which these two members come into contact has a good slidability.

A space defined by the second external side optical member 801, the external side optical member 601 and the support member 203, is filled with the liquid, thus forming a third liquid filling portion 802. A ring-like stopper 804 is provided at a front side end of the support member 203. A ring-like packing member 803 is interposed between the stopper 804 and the second external side optical member 801, thereby keeping the air tightness of the third liquid filling portion 802.

The third liquid filling portion 802 is provided with neither the liquid receding passageway nor the liquid receptacle. The refractive index of the liquid in the third liquid filling portion 802 be, it is desirable, the same as or approximate to the refractive index of the external side optical member 601. Herein, the external side optical member 601 is composed of an acrylic resin of which the refractive index is 1.497, and a silicone oil having a refractive index of 1.469 is used as the liquid in the third liquid filling portion 802. Further, the external side optical member 601 takes a shape of concentric spherical surface, and the inner peripheral surface of the support member 203, on which to support the external side optical member 601, takes a shape of side surface of a cone. Then, a geometry is that an apex of this cone is concentric with the center of a curvature of the external side optical member 601.

Based on this construction, when the pressure in the external region increases, the high pressure is applied to an external region sided surface of the second external side optical member 801 toward the internal region. The outer periphery of the second external side optical member 801, however, moves in parallel towards the internal region without being flexed or deformed in order to have a good slidability. In this case, the third liquid filling portion 802 is not provided with the liquid receding passageway, and therefore the pressure applied to the second external side optical member 801 is uniformly transferred to the external side optical member 601. The external side optical member 601 slides towards the internal region and is flexed or deformed, however, a spherical surface property of each of the two surfaces of the external side optical members is kept, and the center of the spherical surface does not change.

Thus, according to the configuration in FIG. 8, the second external side optical member 801, even when the high pressure is applied thereto, is not flexed or deformed, and, in addition to this, neither the property of the spherical surface of the external side optical member 601 nor the center of the spherical surface changes. Consequently, there occurs almost no light refraction due to the flexure of the interface, thereby making it feasible to obtain an effect of greatly reducing the deterioration of the observed image due to the deformation of the external region sided surface of the external side optical member 601.

When the optical apparatus in each of the second through fifth embodiment discussed above is used as the pressure-proof window integral with or separate from the side wall, the top wall and/or the bottom wall of the deep ocean survey vehicle or vessel as in the first embodiment, the description about the support member 203 in the first embodiment is applied as it is to the relation between the support member, the deep ocean survey vehicle and the corresponding walls in the second through fifth embodiments.

When the optical apparatus in each of the second to fifth embodiments serves as a part of the lens unit of the imaging apparatus such as the camera, etc. used within the deep ocean survey vehicle, the support member is formed in an integral or fixed relation with the fixed drum or barrel of a lens assembly.

Further, when the optical apparatus in each of the second to fifth embodiments is configured as a part of a lens structural body of a camera for photographing, for example, inside the deep ocean, it is required that he support member be formed integrally with a protective drum for protecting the internal region of the lens structural body from the high-pressure seawater defined as the external region. Accordingly, the configuration of the support member as illustrated in the drawings is merely one typical example.

Each of the one-dotted chain lines in FIGS. 7 and 8 is an imaginary representation of, e.g., a partition wall of the deep ocean survey vehicle for partitioning the high-pressure external environment from the normal-pressure internal environment, or the fixed drum of the lens assembly or the protective drum.

Figure 9:
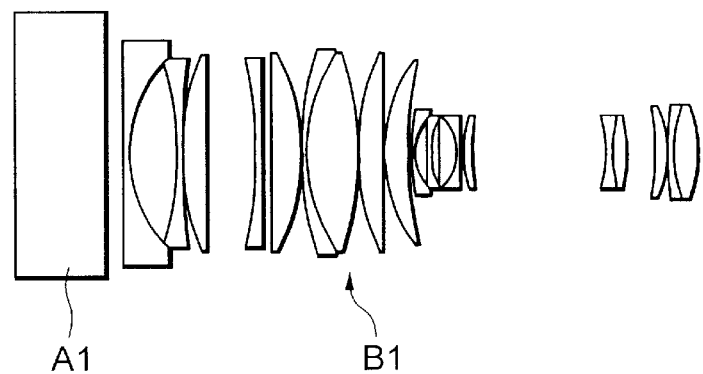
FIG. 9 is a view showing schematically a lens arrangement of a taking optical lens unit as a sixth embodiment of the present invention.
Figure 10:
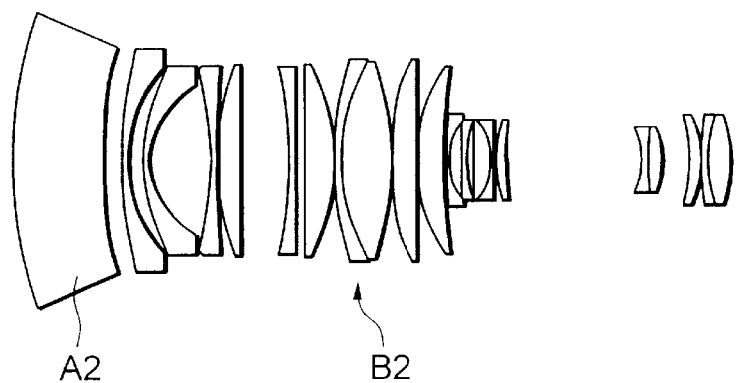
FIG. 10 is a view showing schematically a lens arrangement of a taking optical lens unit as a seventh embodiment of the present invention.
Figure 11:
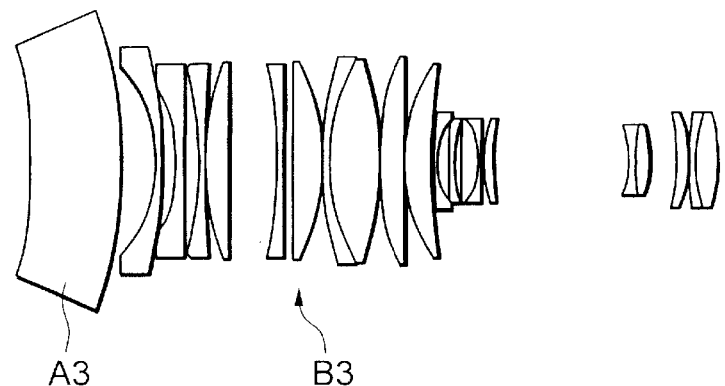
FIG. 11 is a view showing schematically a lens arrangement of a taking-optical lens unit as an eighth embodiment of the present invention.

Next, with reference to FIGS. 9 to 11, three examples of the cases where a pressure-proof optical apparatus of the present invention is used as a part of an optical lens unit for a taking apparatus such as a camera.

FIG. 9 shows a schematic lens arrangement of a taking optical lens unit as a sixth embodiment of the present invention, which embodiment includes a pressure-proof optical apparatus A1 whose external side surface facing to the external region is planer and which corresponds to the first embodiment shown in FIG. 2 or the fifth embodiment shown in FIG. 8, and an optical system B1 arranged behind the pressure-proof optical apparatus A1.

In the case where the external side surface facing the external region is planer like the sixth embodiment, a focusing position of the entire optical system does not change but is same even if the external region is an air space or an underwater, and accordingly this sixth embodiment may be used, suitably for a so-called standard lens unit for a camera.

In the case of the sixth embodiment, deterioration of the quality of an observed image is relatively small with respect to incorrect positioning between the pressure-proof optical apparatus A1 and the inner lens arrangement of the inner optical system B1.

FIG. 10 shows a schematic lens arrangement of a taking optical lens unit as a seventh embodiment of the present invention. A pressure-proof optical apparatus A2 of the seventh embodiment corresponds to each of the pressure-proof optical apparatuses of the second embodiment shown in FIG. 5, of the third embodiment shown in FIG. 6 and of the fourth embodiment shown in FIG. 7 and has an external side surface which is convex toward the external region. In the seventh embodiment, behind the pressure-proof optical apparatus A2, an optical system B2 composed of an optical lens arrangement having a wide angle of view is disposed. The lens arrangement of the seventh embodiment is advantageous in correcting aberrations of incident light rays from wide angle of view and, therefore, is suitable for a so-called wide angle taking lens.

The lens structure of the seventh embodiment is strong against a pressure difference between the external region and the internal region of the lens unit, and is small in deformation caused by the pressure of the external region.

FIG. 11 shows a schematic lens arrangement of a taking optical lens unit as an eighth embodiment of the present invention. A pressure-proof optical apparatus A3 of the eighth embodiment has an external side surface which is concave toward the external region. In the eighth embodiment, behind the pressure-proof optical apparatus A3, an optical system B3 which is suitable for taking a short distant object is disposed. The lens arrangement of the eighth embodiment is advantageous in correcting aberrations of incident light rays from a short distant object such as through a microscope.

The lens structure of the eighth embodiment is strong against a pressure difference between the external region and the internal region of the lens unit, and is small in deformation caused-by the pressure of the external region.

What is claimed is:

1. A taking optical lens unit comprising a first optical system arranged at a front end of the lens unit and comprising a pressure-proof optical apparatus, and a second optical system arranged behind said first optical system and forming a taking optical system together with said first optical system, wherein said pressure-proof optical apparatus comprises:

an external side optical member disposed on the side of an external region;

an internal side optical member disposed on the side of an internal region;

a liquid filling portion formed by filling a space between said external side optical member and said internal side optical member with a liquid; and a liquid receding passageway for receding the liquid in said liquid filling portion if said external side optical member deforms, wherein said external side optical member, said internal side optical member and the liquid are transparent with respect to the light that should be observed.

2. A taking optical lens unit, according to claim 1, wherein said first optical system has an external side surface facing the external region, which surface is planer.

3. A taking optical lens unit, according to claim 1, wherein said first optical system has an external side surface facing the external region, which surface is convex toward the external region.

4. A pressure-proof optical apparatus according to claim 1, further comprising:

a liquid receptacle, connected to said liquid receding passageway, for reserving the liquid receded; and a detection unit for detecting a quantity of the liquid reserved in said liquid receptacle in order to detect a pressure applied to said external side optical member.

5. A pressure-proof optical apparatus according to claim 1, wherein a third optical member is disposed on the side of at least one of the external region existing more outside than said external side optical member and the internal region existing more inside than said internal side optical member, and a space between said third optical member and said external or internal side optical member adjacent to said third optical member is filled with the liquid.

6. A taking optical lens unit comprising a first optical system arranged at a front end of the lens unit and comprising a pressure-proof optical apparatus, and a second optical system arranged behind said first optical system and forming a taking optical system together with said first optical system, wherein said pressure-proof optical apparatus comprises:

an external side optical member disposed on the side of an external region;

an internal side optical member disposed on the side of an internal region;

a liquid filling portion formed by filling a space between said external side optical member and said internal side optical member with a liquid; and a liquid receding passageway for receding the liquid in said liquid filling portion if said external side optical member deforms, wherein said external side optical member, said internal side optical member and the liquid are transparent with respect to the light that should be observed, and wherein at least one of said external side optical member and said internal side optical member has refracting power.

7. A taking optical lens unit, according to claim 6, wherein said first optical system has an external side surface facing the external region, which surface is planer.

8. A taking optical lens unit, according to claim 6, wherein said first optical system has an external side surface facing the external region, which surface is convex toward the external region.

9. A taking optical lens unit comprising a first optical system arranged at a front end of the lens unit and comprising a pressure-proof optical apparatus, and a second optical system arranged behind said first optical system and forming a taking optical system together with said first optical system, wherein said pressure-proof optical apparatus comprises:

a partition member for forming a window opened to an external region and an internal region which are connected liquid- and air-tightly to a partition wall for partitioning the external region from the internal region;

an external side optical member disposed liquid- and air-tightly with respect to said partition member on the side of the external region in an intra-window area of said partition member;

an internal side optical member disposed liquid- and air-tightly with respect to said partition member on the side of the internal region in the intra-window area of said partition member;

a liquid filling portion formed between said external side optical member and said internal side optical member, and filled with the liquid; and a liquid receding passageway for receding the liquid in said liquid filling portion if said external side optical member deforms, wherein said external side optical member, said internal side optical member and the liquid are transparent with respect to the light that should be observed.

10. A taking optical lens unit, according to claim 9, wherein said first optical system has an external side surface facing the external region, which surface is planer.

11. A taking optical lens unit, according to claim 9, wherein said first optical system has an external side surface facing the external region, which surface is convex toward the external region.

12. A pressure-proof optical apparatus according to claim 9, wherein at least one of said external side optical member and said internal side optical member has refracting power.

13. A pressure-proof optical apparatus according to claim 9, further comprising:

a liquid receptacle, connected to said liquid receding passageway, for reserving the liquid receded; and a detection unit for detecting a quantity of the liquid reserved in said liquid receptacle in order to detect a pressure applied to said external side optical member.

14. A pressure-proof optical apparatus according to claim 9, wherein a third optical member is disposed liquid- and air-tightly with respect to said partition member within said window on the side of at least one of the external region existing more outside than said external side optical member and the internal region existing more inside than said internal side optical member, and a space between said third optical member and said external or internal side optical member adjacent to said third optical member is filled with the liquid.

15. A taking optical lens unit comprising a first optical system arranged at a front end of the lens unit and comprising a pressure-proof optical apparatus, and a second optical system arranged behind said first optical system and forming a taking optical system together with said first optical system, wherein said pressure-proof optical apparatus comprises:

a partition member for forming a window opened to an external region and an internal region which are connected liquid- and air-tightly to a partition wall for partitioning the external region from the internal region;

an external side optical member disposed liquid- and air-tightly with respect to said partition member on the side of the external region in an intra-window area of said partition member;

an internal side optical member disposed liquid- and air-tightly with respect to said partition member on the side of the internal region in the intra-window area of said partition member;

a liquid filling portion formed between said external side optical member and said internal side optical member, and filled with the liquid; and a liquid receding passageway for receding the liquid in said liquid filling portion if said external side optical member deforms, wherein said external side optical member, said internal side optical member and the liquid are transparent with respect to the light that should be observed, and wherein at least one of said external side optical member and said internal side optical member has refracting power.

16. A taking optical lens unit, according to claim 15, wherein said first optical system has an external side surface facing the external region, which surface is planer.

17. A taking optical lens unit, according to claim 15, wherein said first optical system has an external side surface facing the external region, which surface is convex toward the external region.

* * * * *